March 22, 1960   A. JACOBS ET AL   2,929,956
CATHODE-RAY TUBE SWEEP CONTROL SYSTEM
Filed June 18, 1958   3 Sheets-Sheet 2

INVENTORS
ALBERT JACOBS
MENDEL HALBERSTAM
BY
ATTORNEY

INVENTORS
ALBERT JACOBS
MENDEL HALBERSTAM
BY
*William T. Pease*
ATTORNEY

United States Patent Office 2,929,956
Patented Mar. 22, 1960

2,929,956

CATHODE-RAY TUBE SWEEP CONTROL SYSTEM

Mendel Halberstam, New York, and Albert Jacobs, Elmont, N.Y., assignors to Autometric Corporation, New York, N.Y., a corporation of New York Application June 18, 1958, Serial No. 742,913

7 Claims. (Cl. 315—10)

This invention relates in general to cathode-ray tube deflection systems and is particularly directed to methods and apparatus for controlling electronic beam deflection voltages so as to produce a beam spot capable of tracing out tube displays having a strictly linear, hyperbolic or any other desired function of time.

In general the function of cathode-ray tube is to provide a visual image of some unknown electrical or signal phenomena as a function of time. For ordinary purposes the visual display does not have to be a strictly faithful reproduction of the driving signal as the signal undergoes its conversion from electrical to light energy. It suffices to have the display demonstrate some reasonable facsimile of the unknown signal from whence it came. However, in certain cathode-ray tube display systems the degree of accuracy between the electrical and visual is highly desirable, such as in radar display arrangements. Here in particular, it is often desirable to have the deflection of the beam spot be a strictly linear or hyperbolic function of time to assure the accuracy and usefulness of the radar display information in the realm of the military and also elsewhere when such information is of a vital and necessary nature.

In many cathode-ray tube deflection systems whenever any of the deflection circuits display some degree of non-linearity, other circuit arrangements are sensitized or activated to produce a signal indicative of the non-linearity, the signal then being used to compensate or counter-balance the degree of non-linearity. These methods of compensation are adequate in the ordinary run of the mill cases where such cathode-ray tubes are used but not where radar and similar systems are used. These ordinary systems do not take into account the actual non-linearity of the visual trace itself. The circuits as in previous systems may have been compensated for non-linearity but the actual trace may still show some measure of non-linearity.

The present invention contemplates compensating for non-linearity of the cathode-ray tube trace by actually utilizing the trace itself as a source of signal information indicative of the degree of non-linearity of the said trace. In this manner the trace itself compensates for its own non-linearity. This type of compensation is achieved by optically imaging externally of the tube the cathode-ray tube trace at a predetermined distance and inserting at the image plane a grating comprising a series of opaque and transparent lines and means in proximity to the grating for intercepting transmitted light and converting it to a series of pulses. The generated pulses will have a spaced time relationship which is a function of the signal trace on the cathode ray tube face. The generated pulses are then compared with a series of similarly spaced pulses produced from an accurately timed standard signal source, in a comparator type of network. The resulting time difference, if any, between the two sets of pulses produces an error signal which is then used to effect a change in the sweep deflection voltage source in a direction to correct for any non-linearity of the cathode-ray tube trace.

It is therefore one object of this invention to provide an improved cathode-ray tube deflection system.

Another object of this invention is to provide a system for maintaining a constant time relationship between the beam deflection voltages and the beam trace.

Another object of the invention is the utilization of the beam trace to produce deflection voltages which are strictly linear and/or hyperbolic functions of time.

Other objects and advantages of the invention will become apparent from a study of the specifications and the accompanying drawings wherein.

Figure 1:
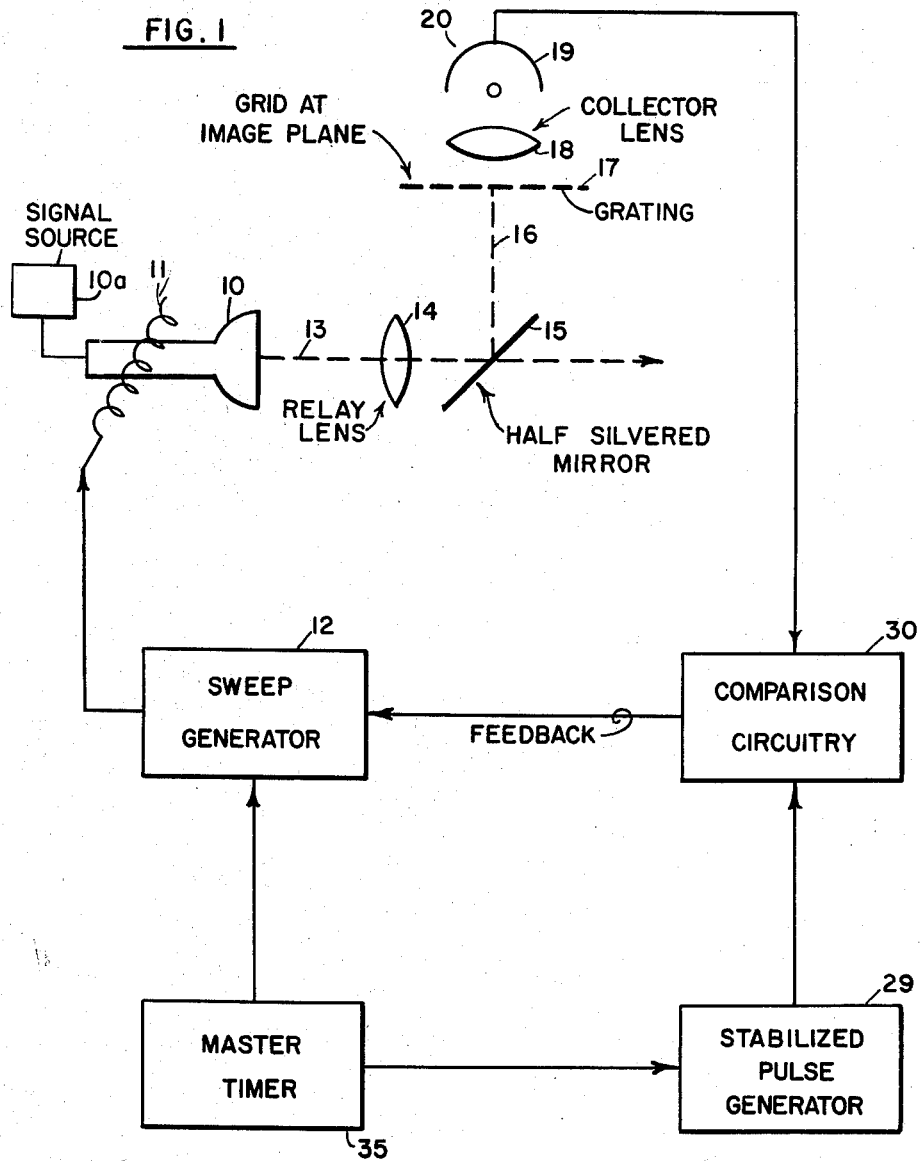
Figure 1 shows a diagram partially in block form of a system for controlling the linearity of the beam trace according to the invention.

Now referring to the drawings and specifically to Figure 1, there is shown therein a system for generating correction signals from a cathode-ray tube display comprising a cathode-ray tube 10, for receiving signals from a signal source 10a and having horizontal and vertical deflecting coils 11, only a single coil being shown for illustration purposes for controlling the deflection of an electron beam in accordance with the sweep deflection voltages produced by sweep generator 12. The beam trace produces an external light path 13 external to the cathode-ray tube which is intercepted by an imaging relay lens 14 and a half-silvered mirror 15. A portion of the beam light path is then transmitted directly through the partially silvered mirror for viewing purposes in the normal and usual manner and another portion of the light beam is also reflected in a direction orthogonal to the transmitted light beam. The reflected light beam path 16 is intercepted by grating 17, which lies in the image plane of the cathode tube trace. That portion of the light beam 16 which is transmitted by the grading 17 is collected or gathered by collector lens 18, and focused on the plate 19 of a photo-sensitive device 20, such as a photo-electric device, to produce an electrical signal having a waveform characteristic determined by the geometric configuration of the light transparency and opacity of the grating.

Figure 3:
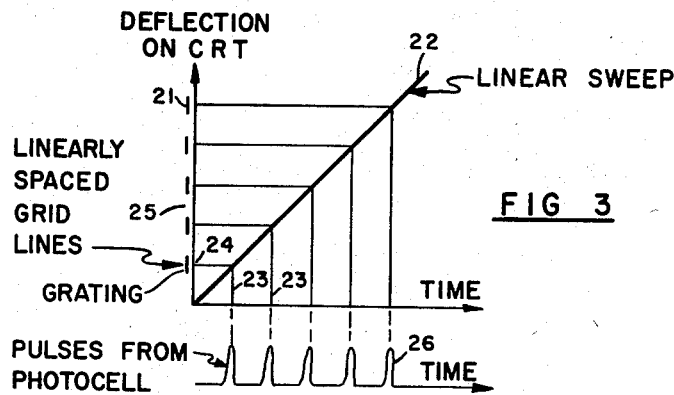
Figure 3 shows a grating structure according to one embodiment of the invention and the pulses derived therefrom in a linear sweep deflection system.

In Figure 3 there is shown therein a grating 21 according to one embodiment of the invention and the manner in which it is formed from a space-time diagram. A linear sweep is generated by a sawtooth voltage source 12, the voltage having a straight line relationship with time as shown by the straight line 22, with equal intervals of time 23 placed on the time axis. The corresponding ordinate of each of the time intervals when intercepting the linear deflection voltage line 22, locates a point of reference 24 on the grating 21 so that these particular points of reference define windows through which the reflected light is passed. The reflected light thus passing through the grating during the normal scanning process is intercepted by the photocell instrumentality 19 which converts the intermittent light projected thereon into a series of pulses equally spaced along the time axis.

Figure 4:
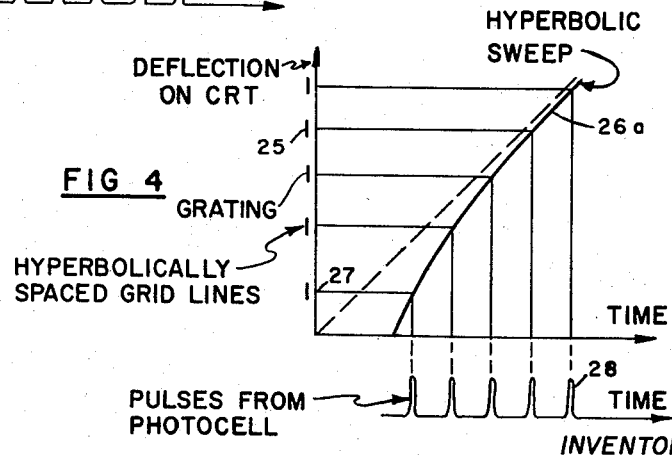
Figure 4 shows a grating structure according to another embodiment of the invention and the pulses derived therefrom in a hyperbolic sweep deflection system.

Figure 4 shows a grating 25 according to another embodiment of the invention which purports to correct any non-linearity where the deflection voltage is a hyperbolic function of time. A hyperbolic sweep voltage curve 26 has its time axis divided into equal segments and the corresponding deflection voltages 27 plotted. The deflection voltage points correspond to reference positions on the grating and define windows for the transmission of light as described with respect to grating 21.

As the electron beam is deflected in accordance with some hyperbolic function of time, the light passing through the defined windows produces again, as in the linear type grating, a series of impulses 28 when intercepted by the photocell 19, which are equally spaced in time. The time function of the deflection sweep voltage of the cathode-ray tubes are selected as a matter of choice, and can be generated by any of the standard types of circuits. In other words where a saw-tooth sweep is desired, the circuitry of the cathode-ray tube instrument is adjusted accordingly. This same procedure of selection applies if the sweep voltages desired are to behave as a hyperbolic, elliptical or other function of time. Having made the appropriate sweep function adjustment the corresponding functional grating is positioned in its proper location. Figs. 3 and 4 show how the grating is formed for a particular time function, so that when the particular sweeping light beam having the same horizontal time function intercepts the grating a series of equally spaced pulses will be formed. It may be appreciated that the grating is formed from a time-space functional diagram and is indicative of the true and correct trace whereas the trace produced by the circuitry of the cathode-ray tube oscilloscope may deviate from the true time function. The comparison of the grating pulses and the timing pulses are made to show if there is any nonlinearity or distortion of the sweeping signals.

It can be appreciated that although for descriptive purposes two typical sweep voltage systems were graphically illustrated, other sweep systems can be used which have for their purpose the construction of a grating having the necessary defined window spacings to produce impulses equally spaced in time.

Figure 2:
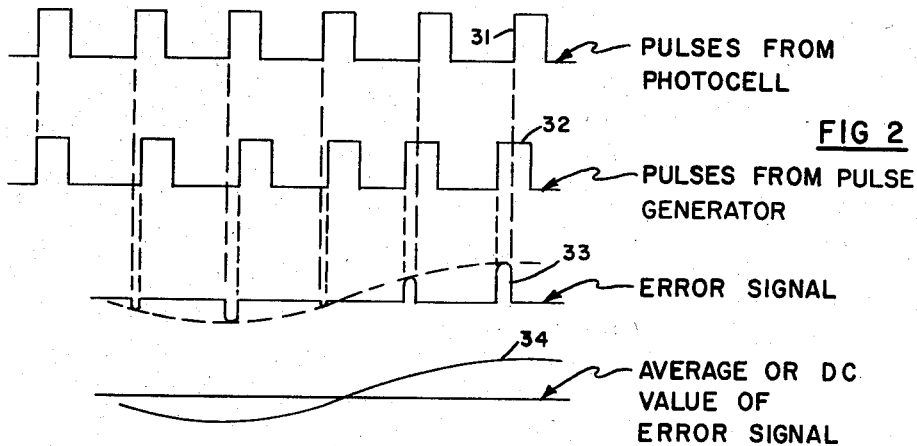
Figure 2 shows a series of signal waveforms and their relative time differences and the resulting error signal produced therefrom.

Again referring to Figure 1, the impulses produced with the aid of the gratings above described are compared with the impulses having the same amplitude and time functions generated by a master or stabilized pulse generator 29, in a comparison circuit 30 to produce an output correction voltage or signal. Figure 2 shows representative waveforms of the impulses 31 generated by the sweeping electron beam across the correction grating and the stabilized impulses 32. The impulses 31 and 32 have equal repetition rates but differ with respect to time, because of the time delay of the trace, so that when compared an error signal results. The error signal is averaged out to produce an average or D.C. signal 34 indicative of the phase or time difference between the stabilized pulses and the grating generated pulses. The error signal is then fed back to the sweep generator 12 to control and correct the deflection voltage to compensate for the non-linearity or distortion of the time base.

Figure 5:
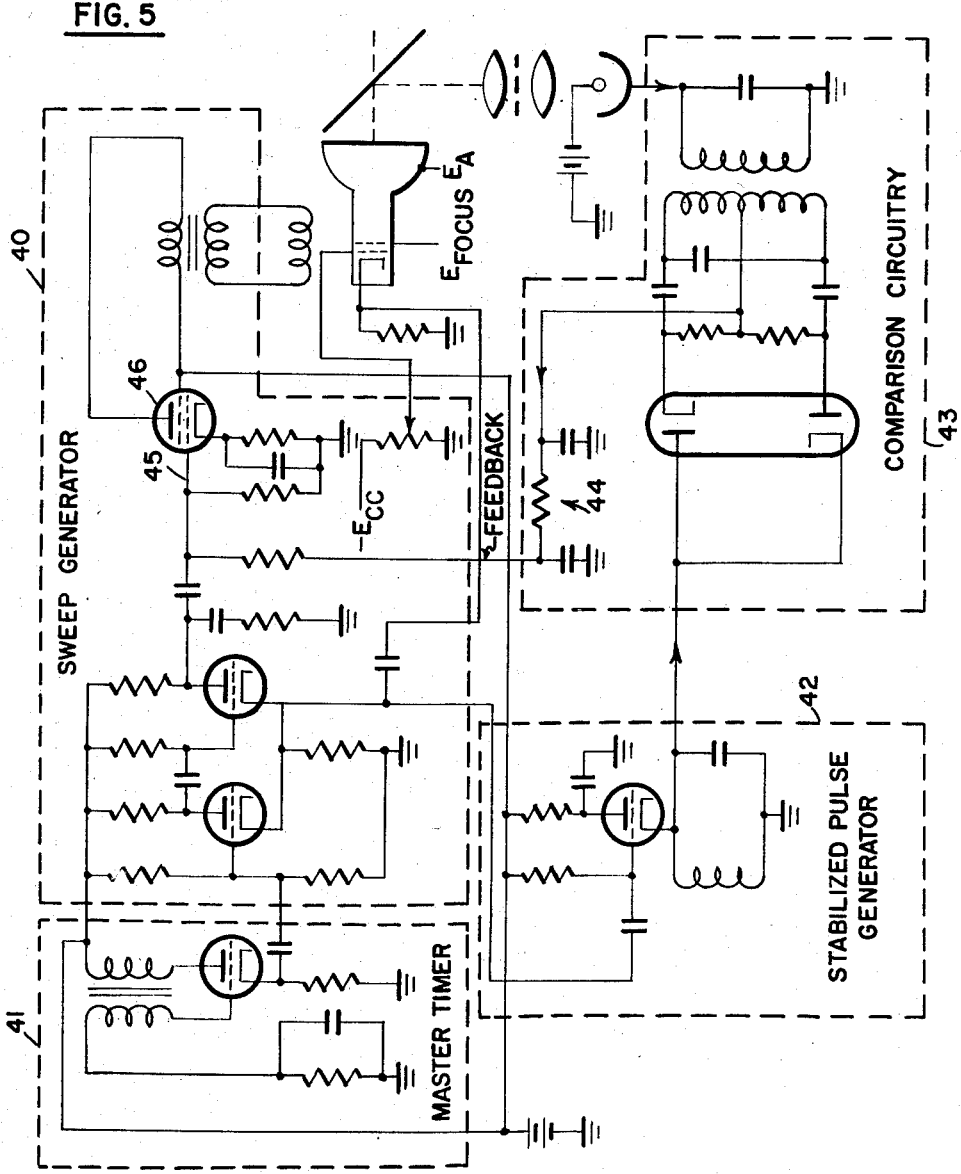
Figure 5 shows a schematic diagram of a system for controlling the linearity of the beam trace according to the invention.

Figure 5 is a diagram of a typical system for controlling the linearity of the beam trace in accordance with the invention. The circuitry is merely representative and there are other forms of circuitry which may be used just as well to accomplish the same end result. More specifically a sweep generator 40 is synchronized by a master timer circuit 41 which is a highly stabilized relaxation type of oscillator. A pulse forming circuit 42 is also synchronized from the master timer circuit to produce a series of accurately timed pulses. The pulses are transmitted to a comparator type of circuit, which is a discriminator circuit 43. Pulses, formed as a result of the grating structure above described and the photoelectric means, are also transmitted to the discriminator 43. The resulting phase or time difference, if any, between the pulses being compared results in an error signal which is filtered or averaged out by an RC network 44, to produce a variable D.C. voltage. The D.C. voltage so developed is then fed to the grid 45 of the sweep generator driving tube 46, to alter the sweep voltage output of the driver tube in a manner to compensate for the non-linearity of the signal trace.

Various possible modifications will be readily apparent to those skilled in the art, such modifications being considered as lying within the scope of this invention. The disclosure herein of specific apparatus for use in connection with the system is therefore intended to be illustrative only and not as a limitation upon the system as claimed.

What is claimed is:

1. A cathode-ray tube sweep control system including beam generating means comprising a cathode ray-tube beam deflection means to produce a cathode ray tube trace in accordance with a predetermined time function grating, means produced in accordance with the said time function and responsive to the trace for producing a series of equally spaced impulses indicative of the time differential of the trace from its true time function, means synchronous with the beam deflection means for producing a stabilized series of equally spaced impulses, means for receiving and comparing the time differential and stabilized pulses to produce an error signal indicative of the time difference of the signal trace from its true time function and means responsive to the error signal for controlling the beam deflection means to produce a trace in accordance with the true time function of the said deflection means.

2. A cathode-ray tube sweep control system according to claim 1 and wherein the said trace responsive means includes a grating structure having a plurality of transparent windows spaced in accordance with a predetermined time function as plotted from a voltage-time functional diagram.

3. A cathode-ray tube sweep control system according to claim 2 and wherein the spaced transparent windows lie in a direction transverse to the direction of the scanning beam.

4. A cathode-ray tube sweep control system according to claim 1 and wherein the said trace responsive grating means includes photoelectric means for converting the light transmitted from the cathode-ray tube and through the grating transparent windows into equally spaced impulses.

5. A cathode-ray tube sweep control system including beam generating means comprising a cathode-ray tube, beam deflection means to produce a cathode-ray tube trace in accordance with a predetermined time function, means including relay lenses for imaging the trace at an image plane of the cathode-ray tube, means including a grating produced in accordance with the said time function and interposed in the said image plane for producing a series of equally spaced impulses indicative of the time differential of the trace from its true time function stabilized pulse generating means synchronous with the beam deflection means for producing a stablized series of equally spaced impulses, a comparison circuit for receiving the time differential and stabilized pulses to produce an error signal indicative of the time difference of the signal trace from its true time function and means responsive to the error signal for controlling the beam deflection means to produce a trace in accordance with the true time function of the said deflection means.

6. A cathode-ray tube sweep control system according to claim 5 and wherein the comparison circuit includes a discriminator for receiving signals having a phase difference in order to produce an output signal indicative of the said phase difference.

7. A cathode-ray tube sweep control system according to claim 5 and wherein the said trace imaging means includes a partially silvered mirror for intercepting a portion of the trace image light and for transmitting the remainder of the said trace image light.

References Cited in the file of this patent

UNITED STATES PATENTS

| | | |
|---|---|---|
| 2,415,191 | Rajchman | Feb. 4, 1947 |
| 2,659,828 | Elliott | Nov. 17, 1953 |
| 2,675,500 | Kuchinsky | Apr. 13, 1954 |
| 2,685,661 | Barton | Aug. 3, 1954 |
| 2,743,379 | Fernsler | Apr. 24, 1956 |